No. 890,137. PATENTED JUNE 9, 1908.
E. H. GOLD.
CIRCULATING DEVICE.
APPLICATION FILED JAN. 30, 1905.

6 SHEETS—SHEET 1.

Witnesses:

Inventor:

No. 890,137. PATENTED JUNE 9, 1908.
E. H. GOLD.
CIRCULATING DEVICE.
APPLICATION FILED JAN. 30, 1905.

6 SHEETS—SHEET 3.

Witnesses:
Robert H. Weir
J B Weir

Inventor
E. H. Gold
By Raymond ...
Atty.

No. 890,137. PATENTED JUNE 9, 1908.
E. H. GOLD.
CIRCULATING DEVICE.
APPLICATION FILED JAN. 30, 1905.
6 SHEETS—SHEET 4.
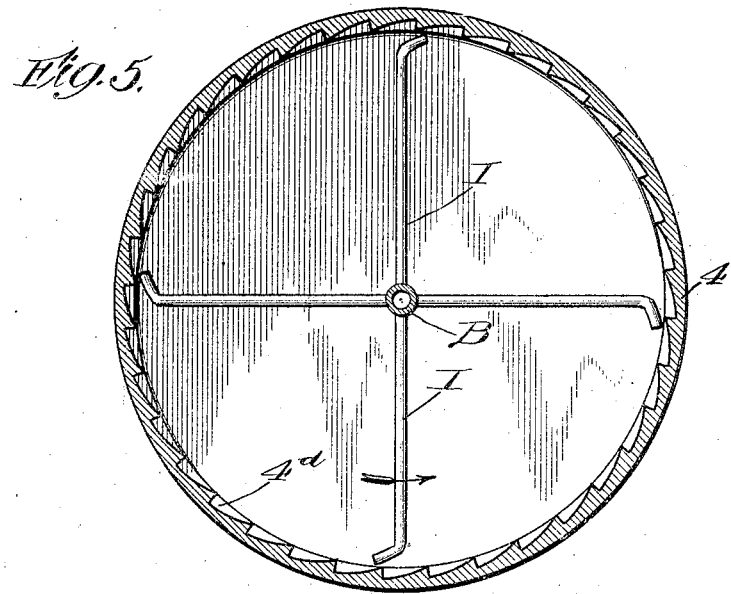
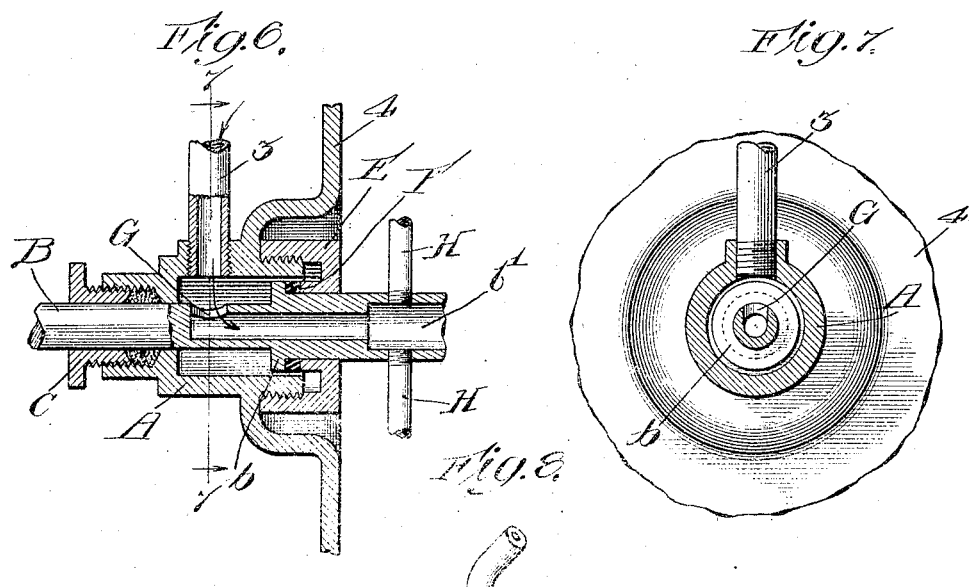
Witnesses:
Inventor:
E. H. Gold No. 890,137. PATENTED JUNE 9, 1908.
E. H. GOLD.
CIRCULATING DEVICE.
APPLICATION FILED JAN. 30, 1905.

6 SHEETS—SHEET 5.

Witnesses:
Robert H. Weir
J. B. Weir

Inventor:
E. H. Gold
By Raymond Bartlett
Attys.

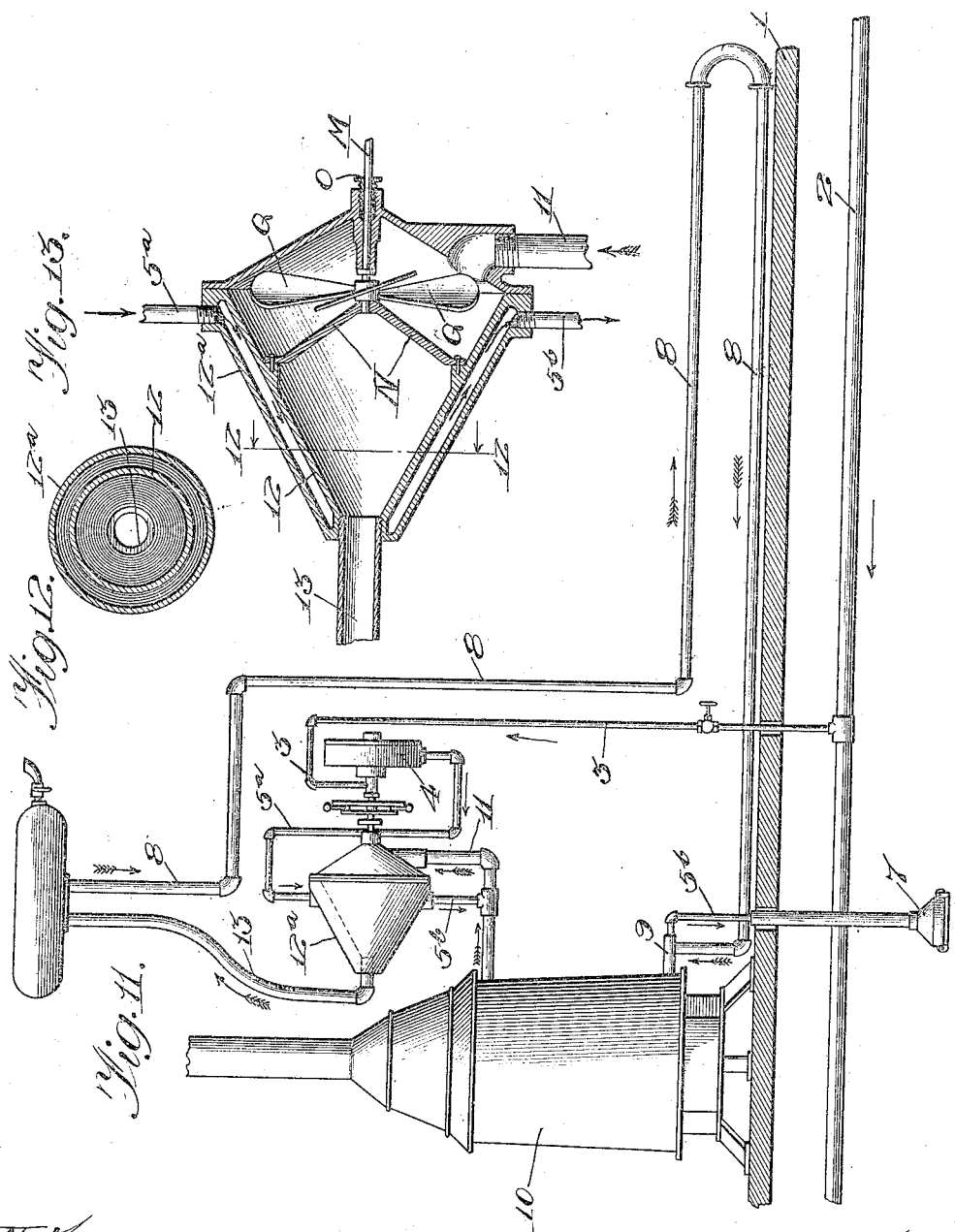

UNITED STATES PATENT OFFICE.

EGBERT H. GOLD, OF CHICAGO, ILLINOIS.

CIRCULATING DEVICE.

No. 890,137.  Specification of Letters Patent.  Patented June 9, 1908.

Application filed January 30, 1905. Serial No. 243,362.

*To all whom it may concern:*

Be it known that I, EGBERT H. GOLD, a citizen of the United States, residing at Chicago, in the county of Cook and State of Illinois, have invented certain new and useful Improvements in Circulating Devices, of which the following is a specification.

My invention relates to improvements, first, in steam motors especially in combination with means for mechanically creating a circulation of fluid, in a fluid circulating system, and particularly as adapted to the conditions and applied to the circulating system and heaters of a hot-water car-heating system.

While my invention provides a novel steam engine and novel connections, whereby, among other results, the mechanical circulation of a fluid in a closed system may be accomplished, the particular object of my invention is to provide means for causing such circulation in a car-heating system, and especially to provide such means so that the system shall be self-contained in all respects. These and such other objects as may hereafter appear are attained by my invention, a convenient application of which to a car heating system is shown in the accompanying drawings, in which—

Figure 1:
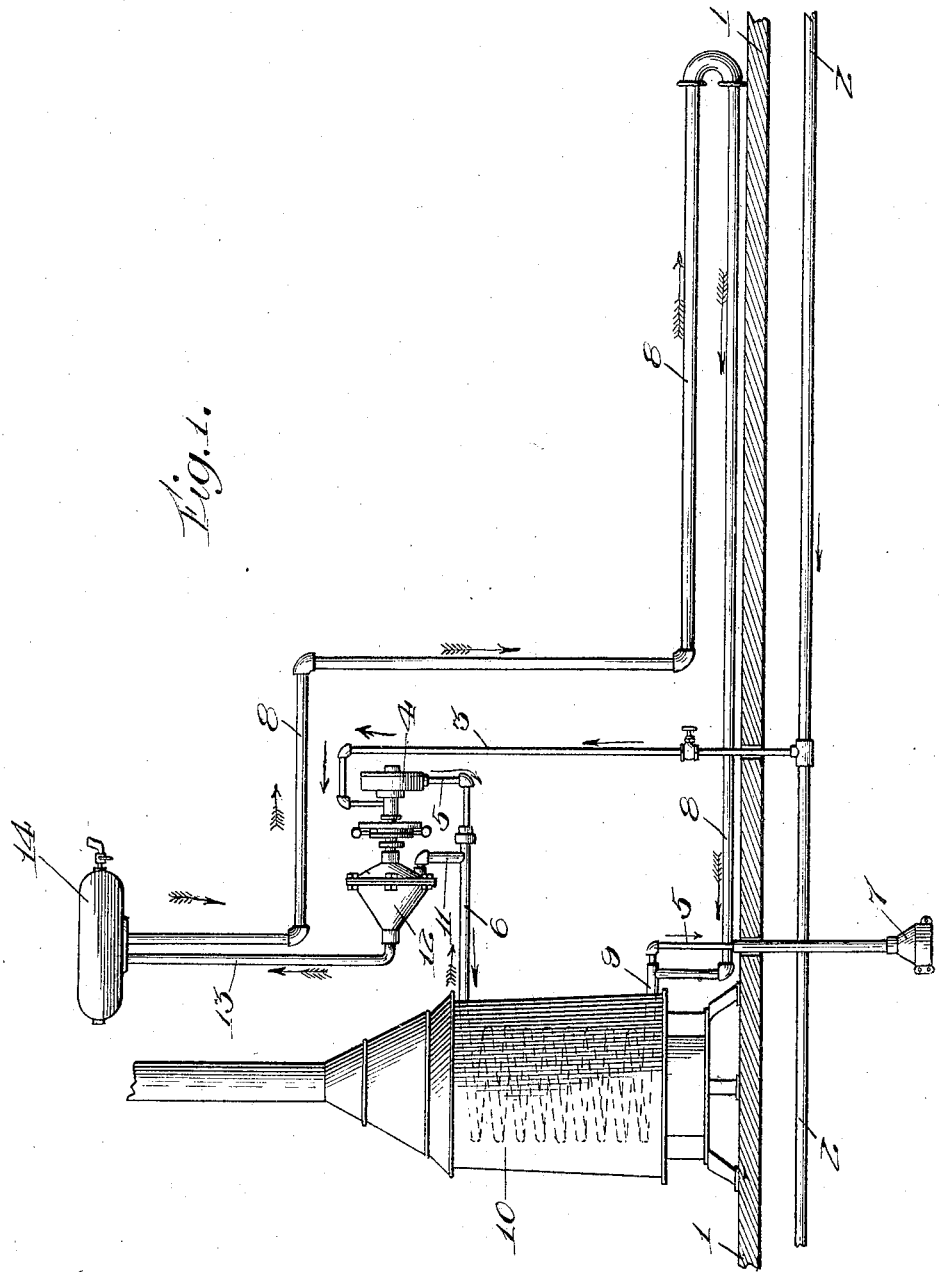
Figure 2:
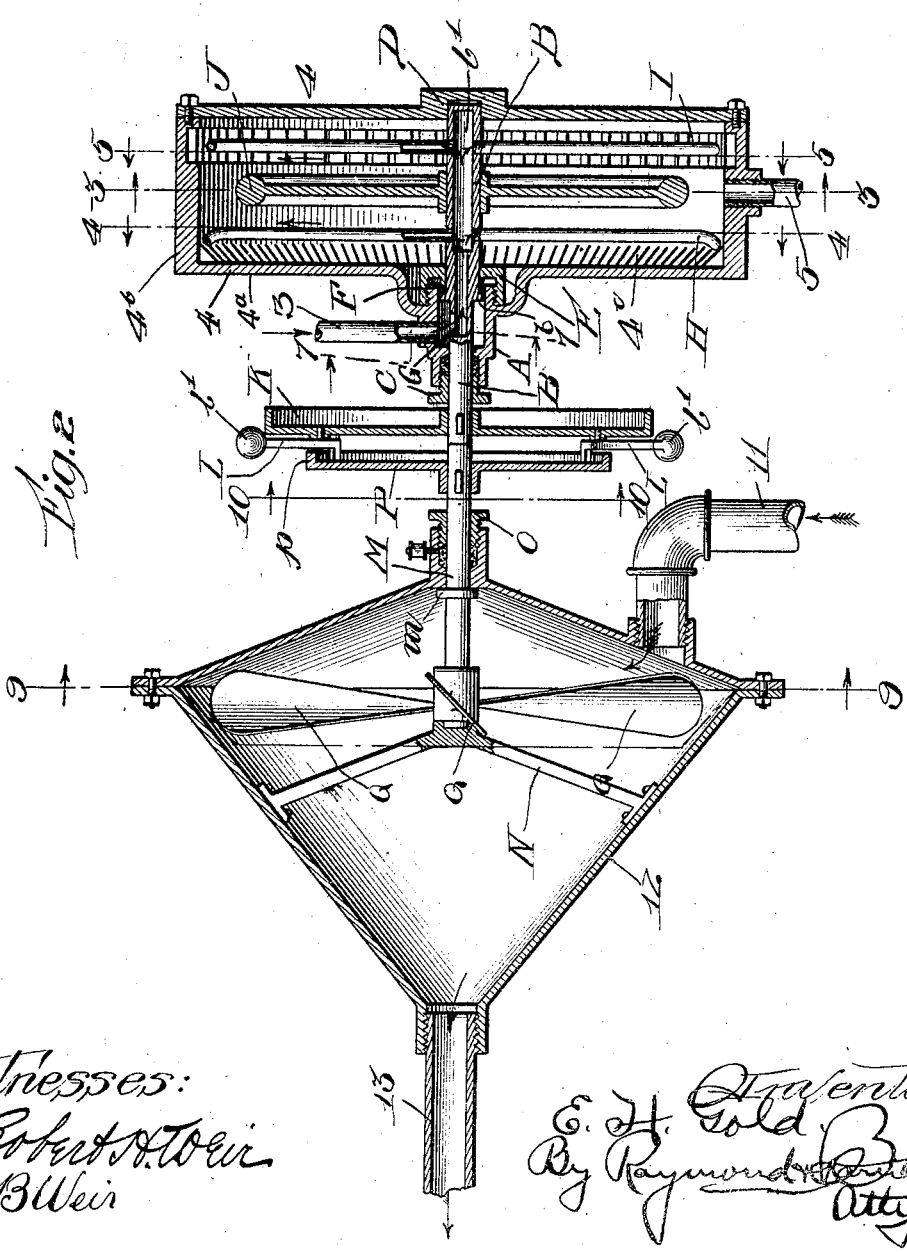
Figure 3:
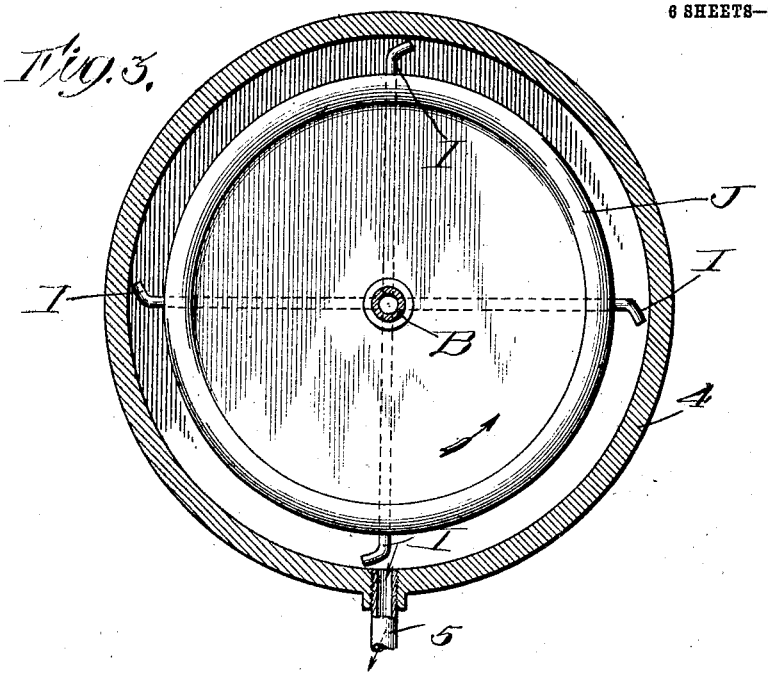
Figure 4:
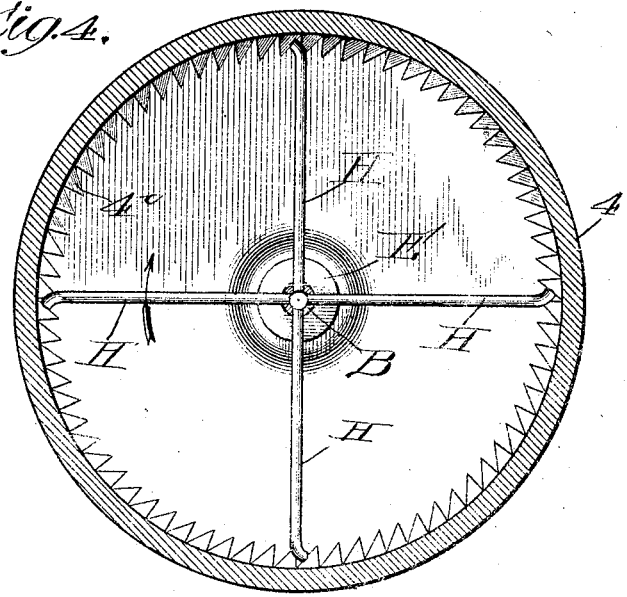
Figure 9:
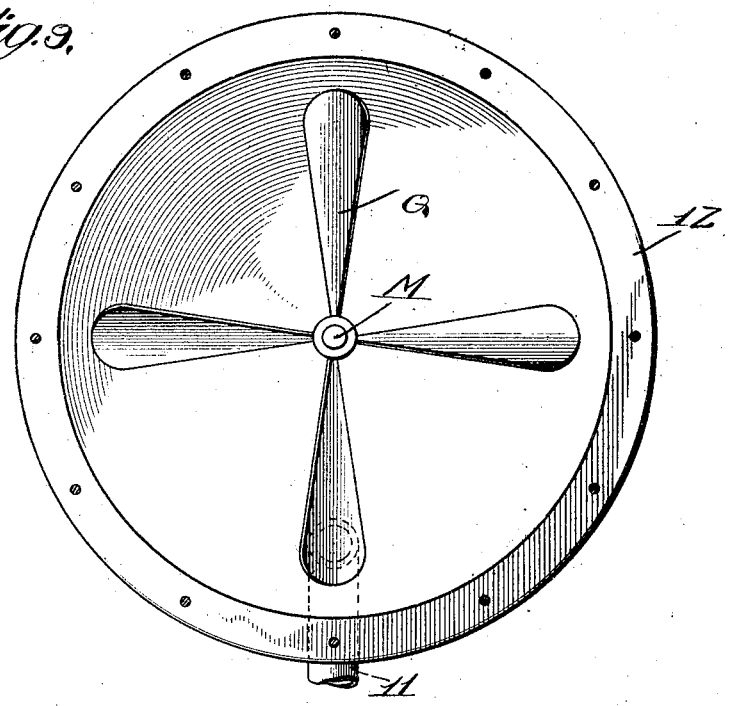
Figure 10:
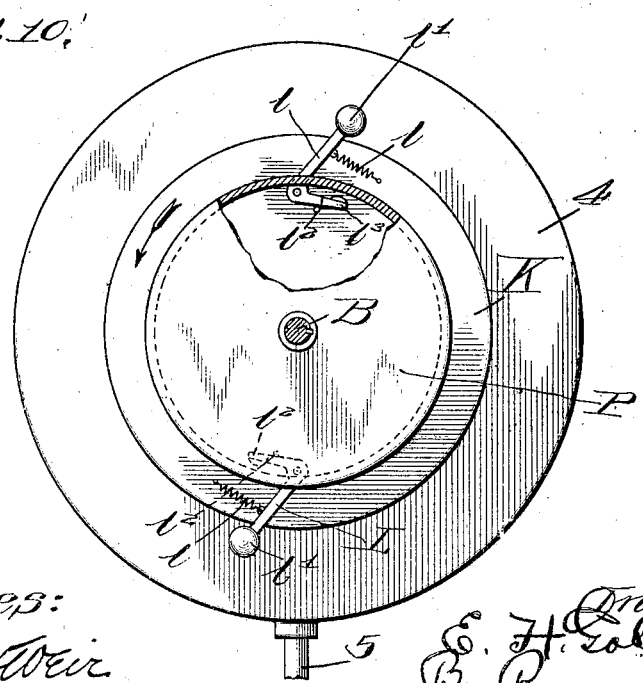

Figure 1 indicates diagrammatically a typical hot water system for heating passenger cars. Fig. 2 shows an enlarged sectional detail of a circulating device, embodying my invention. Fig. 3 is a sectional view on the line 3—3 of Fig. 2, looking in the direction indicated by the arrows. Fig. 4 is a like view on the line 4—4 of Fig. 2, looking in the direction indicated by the arrows. Fig. 5 is a like view on the line 5—5 of Fig. 2, looking in the direction indicated by the arrows. Fig. 6 is an enlarged sectional detail of Fig 2. Fig. 7 is an enlarged detail on the line 7—7 of Fig. 2, looking in the direction indicated by the arrows. Fig. 8 is a detail of an end of one of the motor tubes. Fig. 9 is a sectional view on the line 9—9 of Fig. 2, looking in the direction indicated by the arrows. Fig. 10 is a sectional view on the line 10—10 of Fig. 2, looking in the direction indicated by the arrows. Fig. 11 shows a modification in the arrangement of the propeller chamber. Fig. 12 is a cross-sectional view on the line 12—12 of Fig. 13, looking in the direction indicated by the arrows; and Fig. 13 is an enlarged sectional detail of a modified form of propeller chamber.

Although, as previously indicated, my invention is not necessarily confined to a car heating system, it is especially intended for such use and, since in the accompanying drawings I have shown it so adapted, I shall in the following specification describe it as a part of a car heating system, but without necessarily thereby limiting myself to such embodiment.

Referring to Fig. 1, 1 indicates the floor of a car, below which extends the train-pipe 2. A feed-pipe 3 conducts steam from the train-pipe to the motor 4, thence by pipe 5 to the compound coil 6, from the lower end of which the pipe 5 merges and connects with an automatic steam trap 7. 8 are the circulating and radiating pipes of the car, which connect with the lower end of the water pipe 9 of the compound coil 6, it being understood that the compound coil 6 consists of the water pipe 9, through which extends the steam pipe 5. The compound coil 6 is mounted within the combustion chamber of a stove, or Baker heater, 10. From the upper end of the water pipe 9 of the compound coil 6, the pipe 11 extends to one side of a propeller chamber 12, from an opposite side of which chamber a riser 13 leads to the expansion tank 14.

In operation, when the water within the system is heated by means of steam, the steam entering the motor casing 4 actuates the motor, which rotates the propeller in the casing 12, the blades of the propeller being so set that such rotation will draw water into the casing 12 from the pipe 11 and force water out of the casing 12 through the riser 13, thus causing the water to circulate through the pipe 8 and through the water pipe 9 of the coil 6. The course of the water is shown by feathered arrows, the course of the steam by unfeathered arrows.

Steam passes from the motor casing 4, through the pipe 5, into the compound coil 6, where its heat is rapidly absorbed by the cold water in the water pipe 9, so that the coil 6 acts as a condenser for the steam in the pipe 5, causing a rapid condensation and reduction of steam pressure, and thus continuing a free flow of steam through the pipe 3, into and through the motor casing 4.

The forced circulation causes the slightly heated water in the water pipe 9 of the coil 6 to be quickly drawn out of the coil 6 and replaced with cold water from the circulating pipes, so that the rapid condensation continues until there is a substantially uniform rise in temperature of the water throughout the circulating system.

After the temperature of the water within the coil 6, the pipe 11, the chamber 12 and the riser 13, has reached a certain point, the water will tend to freely circulate throughout the system and, as the necessity for a forced circulation ceases, there will be a less rapid condensation of steam within the pipe 5. Consequently, as the steam within the pipes 3 and 5 arrives at an approximately uniform temperature and pressure, the motor will cease to operate, but whenever, from any cause, there is a material drop in the temperature of the water in any part of the circulating system there will be a correspondingly rapid increase of condensation of steam within the compound coil 6, and the motor and propeller will again be brought into action. When, however, the steam heater is not used and the coil 6 is heated by means of a fire within the heater 10, while the motor and propeller may remain inactive, they will afford no objectionable obstruction to the water, and the heated column of water will be free to circulate through the chamber 12 and between the blades of the propeller. Such, in brief is the operation of my device, the detailed construction of which, as shown in the drawings, is as follows:

Referring particularly to Fig. 2, it will be noted that steam from the pipe 3 enters the steam chamber in a box A which is provided on one side of the motor casing 4. Extending axially through the box A is a shaft B, journaled within the walls of the box A and extending outwardly through a stuffing-box C. This shaft B extends into and across the motor casing 4 and is shown as journaled at D in said casing. The shaft B has preferably some longitudinal play, and is provided with a collar or flange $b$. The inner end of the box A is closed by a cap E, through which the shaft B extends, and within which it may be journaled, if desired.

Loosely mounted upon the shaft B, and between the flange $b$ and the cap E, is a packing ring F of Jenkins material, or of any other suitable material. The shaft B is hollow from the interior of the box A to the end which is journaled at D, and is provided with a perforation or passage G connecting the interior of the shaft with the interior of the box A.

Mounted upon the shaft B, within the motor casing 4, are two sets of motor arms H and I, which are hollow, connecting with the interior of the shaft B, and which are provided with constricted openings at their outer ends, through which they discharge into the interior of the casing 4. The shaft B is preferably provided with an enlarged chamber $b'$, with which the motor arms H and I are connected.

Mounted upon the shaft B is a fly-wheel J. The motor arms H are bent to discharge towards the angle formed by the wall $4^a$ with the wall $4^b$ of the casing 4, in or across which angle are arranged a plurality of corrugations or pockets $4^c$, the wider faces of which extend in such a plane that the jets discharged from the bent ends of the motor arms H will strike vertically against said faces, and so as to force the shaft B towards the bearing D, as well as to rotate the shaft B. The discharge ends of the motor arms I are also bent, but are preferably bent in the plane of rotation of the arms I, and so as to impinge against a plurality of pockets $4^d$, provided on the interior of the casing 4, the shorter walls of which pockets are substantially radial to said casing and are connected by long, inclined, or curved, walls, which connect the base of one short wall with the apex of the next, so that the jets projected from the motor arms I will impinge most directly against the short radial walls, thus exerting the highest efficiency in rotating the shaft B. As a result of this construction, the force exerted by the jets projected from the arms H, and the pressure of steam within the box A against the flange $b$, will tend to force the shaft B towards the bearing D and to compress the packing washer or ring F between the flange $b$ and the cap E, thereby sufficiently packing the joint between the interior of the box A and the interior of the casing 4.

Steam entering the box A, through the pipe 3, will have no outlet, except through the opening G, into the interior of the shaft B, and thence into the chamber $b'$. These passages are preferably so proportioned that in its initial flow steam will enter the chamber $b'$ much more rapidly than it will flow out through the arms H and I, so that a body of steam under pressure will gather within the chamber $b'$. As the pressure within the chamber $b'$ increases, the velocity of the flow through the arms H, I, will correspondingly increase, until the inflow through the pipe 3 will equal the outflow through the arms H, I. The jets projected at high velocity through the arms H, I, will, in a familiar manner, cause the rotation of the shaft B and, as the parts are so proportioned that the arms H, I, will just safely clear the walls of the pockets $4^a$ and $4^d$, the impinging and partial huddling of the steam within said pockets will increase the motor efficiency of the steam in causing the rotation of the shaft B. The fly-wheel J will, of course, act in the usual manner in steadying the operation of the mechanism and in tending to continue the rotation of the shaft B.

Keyed to the outer end of the shaft B, beyond the stuffing-box C is a disk K, to which are pivoted clutch arms L. These clutch arms L are held in their normal position, as shown more clearly in Fig. 10, by springs $l$, and are provided at their outer ends with weights $l'$. Stops $l^2$ serve, in conjunction with the springs $l$ to hold said arms in their position of rest. These clutch arms, it will be noted, are in the shape of a bell-crank lever, the long arm of which in a position of rest, extends tangentially to the disk K.

Journaled within the propeller casing 12, is a shaft M, supported at one end by a bracket N, and journaled at the other end in said casing and extending through a stuffing box O. Said shaft is also provided with a collar $m$, which serves as a stop to limit the movement of said shaft in the direction of the motor casing 4. The free ends of the shaft B and the shaft M are arranged closely adjacent to each other, and the free end of the shaft M has keyed to it a disk P, which is provided with an annular flange $p$ extending toward the disk K and around a lateral projection $l^3$ on the short arms of the clutch levers L, said projections $l^3$ being provided with a friction face, adapted to make frictional contact with the inner face of said flange $p$.

Mounted upon the shaft M, within the propeller casing 12, are propeller blades Q, set at such an angle that in the normal operation of the device, the rotation of the blades Q will force water out of the casing 12 through the pipe 13. As steam enters through the pipe 3, the box A and shaft B, it is projected through the arms H, I, into the interior of the motor casing 4, whence it finds a free outlet through the pipe 5 and is conducted to the compound coil 6 which, as before explained, operates as a condenser, the water of condensation being automatically discharged, in a familiar manner, through the automatic trap 7.

As the rotation of the shaft B, caused by the projection of steam through the motor arms H, I, increases in rapidity, the centrifugal weights $l'$ on the clutch arms L are thrown outwardly against the tension of the springs $l$, and the lateral projections $l^3$ are brought into frictional contact with the inner face of the flange $p$ on the disk P. As this frictional contact is established, it starts the rotation of the disk P, until the disks P and K are rotating in unison, with a corresponding rotation of the shaft M and the propeller blades Q. This rotation of the propeller blades Q, as before explained, forces water out of the propeller chamber 12 through the pipe 13, and draws water into the propeller chamber 12 through the pipe 11, and the forced circulation is established.

It will thus be seen that with the described embodiment of my invention, in its initial operation the motor carries no load except the friction incident to its own operation, and acquires no load until it has acquired a speed which brings the friction clutch into operation, such operation of the friction clutch being to gradually put the load on the motor until the apparatus is running at full speed. It will also be noted that the high speed of rotation acquired by the fly-wheel before the friction clutch is in operation, tends to continue the rotation of the motor, as the load is gradually put on it by the operation of the clutch device. But, whenever the condensation of steam within the pipe 5 becomes materially slower, because of the heating of the water of circulation throughout the system, the flow of steam through the motor arms H, I, will become correspondingly slower, and the speed of rotation of the motor will gradually decrease until the springs $l$ overcome the centrifugal action of the weights $l'$, the clutch is disconnected, and the propeller ceases to rotate.

On the other hand, whenever the temperature of the water of circulation is materially lowered, the rate of condensation, within the compound coil 6, will increase, the flow of steam through the motor will increase, and the motor will again be put into operation. If the drop in temperature of the water of circulation is sufficient to be really material, the result will be to produce such an increasing speed of the motor as will again connect the clutch and set the propeller into operation, thus increasing the speed of circulation of water through the pipes, and rapidly bringing the water of circulation to the required temperature.

In Fig. 11, I have illustrated another arrangement in which the steam-pipe $5^a$ leads from the motor-casing 4 to a jacket $12^a$, which surrounds the propeller-casing 12, from which jacket the pipe $5^b$ leads to the coil within the heater 10. In this arrangement the jacket $5^a$ and the casing 12 constitute a condenser, which is conveniently arranged immediately adjacent to the motor-casing 4, so as to quickly produce an operative difference in pressure between the pipe 3 and the pipe $5^b$.

While I have thus shown different arrangements, which typically illustrate my invention, it will clearly be seen that the use of a fire heater and of a steam heater is not necessary for my invention, nor, in its fundamental character, does it matter what kind of a heater is applied to the circulating system or, if a steam jacket is used, it matters not whether the steam-jacket is in the form of a coil surrounding the water-coil or in the form of a steam-jacket surrounding the propeller-casing or in any other well known form of device whereby the heat of the steam is imparted to the water of the circulating system. The particular form of device used for heating the water is primarily of no consequence.

While in the drawings, as above explained, I have shown my invention embodied in one desirable form adapted for use in a car heating system, it will be understood that many changes may be made in details, proportions and arrangement, either as a matter of adaptation, convenience, shop expedient or mechanical skill, without departing from the spirit of my invention, which is by no means confined to the exact mechanism shown.

Although I do not here claim broadly the use, in a circulating system, of mechanical means for producing a forced circulation, nor the use broadly of any kind of steam-motor for producing such circulation, as is broadly claimed in my copending application Serial No. 240,823, I do claim broadly the novel structure here shown and hereafter claimed; but, while the separation of the motor-shaft from the propeller-shaft is desirable, it is not essential, and so it will appear that either the clutch mechanism shown, or any other clutch mechanism, is non-essential, that the number or precise form of the motor arms, the shape or arrangement of the motor casing, the use or omission of the steam pockets opposed to the outlets from the motor arms, the use or omission of the fly-wheel, the particular manner of packing joints, etc., are all matters of convenience and expediency, but do not constitute essentials for the purpose of my invention, which covers broadly the combination with a circulating system, of a motor of the generic type shown, arranged to produce a forced circulation as hereinafter claimed.

I claim:

1. The combination with a fluid heating system, of an engine, a mechanical circulator interposed in said system, means for supplying a motor fluid under high temperature so as to actuate said engine, a condensing jacket in operative contact with a portion of said system, means for conducting the exhaust from said engine to said jacket, and a clutch mechanism interposed between said engine and said circulator and arranged to automatically connect said circulator with said engine whenever said engine attains a given speed, and to automatically disconnect the engine from said circulator whenever the engine drops below a given speed.

2. The combination with a circulating system, of a fluid heater in operative contact therewith, a mechanical circulator interposed in said system, a motor arranged to operate said circulator, means for conveying a heating fluid under pressure to said motor so as to actuate the same, means for conducting said heating fluid from the exhaust of said motor to said fluid heater, and a clutch arranged to automatically connect said circulator with said motor whenever the motor reaches and maintains a given speed, and to automatically disconnect the motor from the circulator whenever the motor drops below a given speed.

3. In a heating apparatus, the combination of a hot water circulatory system, with a source of supply of steam, a conduit for the steam connected at one end with the source of supply, an automatic steam trap connected to the other end of said conduit, a circulating device in the water circulatory system, a heater connected with the steam conduit and in operative contact with the water circulatory system, a suitable motor located in said conduit between said heater and said trap and adapted to be operated by the flow of steam through said conduit, all so arranged that the motor will be automatically stopped when the effectiveness of the heater to circulate the water is increased to a certain point and operative connections between the motor and the circulating device.

4. In a heating apparatus, the combination of a hot water circulatory system, with a source of steam supply, a conduit for the steam connected at one end with the source of supply, an automatic steam trap connected to the other end of said conduit, a circulating device in the water circulatory system, a heater connected with the steam conduit and in operative contact with the water circulatory system, a suitable motor located in said conduit between said heater and said trap adapted to be operated by the flow of steam through said conduit and a clutch arranged to automatically connect the circulating device with the motor when the motor reaches and maintains a given minimum speed and to automatically disconnect the circulating device whenever the motor drops below such speed.

5. The combination with a system of pipes, for circulating heated water, of a coil of pipes wherein such water is heated, a coil of steam pipes arranged so that the water in the water coil is heated by the steam passing through the steam pipes, a steam inlet pipe, a motor connected therewith, a propeller casing arranged in said water circulatory system, a propeller therein adapted to be driven by the motor, said propeller casing being of greater diameter than the diameter of the pipes of the water circulating system, a steam jacket around said propeller casing, and connections between the exhaust of the motor and the jacket and between the jacket and the steam coils, whereby the exhaust from the motor is first brought into contact with the relatively large and cold condensing surface of the propeller casing and afterwards passes to the steam coils.

EGBERT H. GOLD.

Witnesses:
  M. E. SHIELDS,
  F. H. DRURY.